United States Patent [19]

Yoshikawa et al.

[11] Patent Number: 5,248,472
[45] Date of Patent: Sep. 28, 1993

[54] METHOD OF AND APPARATUS FOR MANUFACTURING TUBULAR THERMOPLASTIC RESIN FILM HAVING A ROUGH INNER SURFACE

[75] Inventors: Shigeru Yoshikawa; Takao Ijiri, both of Fujinomiya, Japan

[73] Assignee: Terumo Kabushiki Kaisha, Tokyo, Japan

[21] Appl. No.: 935,476

[22] Filed: Aug. 25, 1992

Related U.S. Application Data

[63] Continuation of Ser. No. 664,032, Mar. 4, 1991, abandoned.

[30] Foreign Application Priority Data

Mar. 9, 1990 [JP] Japan .................. 2-56696

[51] Int. Cl.$^5$ .............................. B29C 47/86
[52] U.S. Cl. .................. 264/519; 264/209.7; 264/327; 425/326.1; 425/379.1; 425/467
[58] Field of Search ............. 264/519, 209.7, 327; 425/378.1, 379.1, 467, 326.1

[56] References Cited

U.S. PATENT DOCUMENTS

| | | |
|---|---|---|
| 2,876,497 | 3/1959 | Alexander . |
| 3,508,554 | 4/1970 | Sheridan ............... 264/209.7 |
| 3,767,346 | 10/1973 | Mihalik ............... 425/378 R |
| 4,229,407 | 10/1980 | Craig ..................... 264/519 |
| 4,329,314 | 5/1982 | Jackson et al. ........... 425/378.1 |
| 4,359,439 | 11/1982 | Fritsch et al. ........... 425/378.1 |
| 4,997,616 | 3/1991 | Dehennau et al. ........ 264/209.7 |

FOREIGN PATENT DOCUMENTS

| | | |
|---|---|---|
| 230105 | 9/1960 | Australia . |
| 0210108 | 1/1987 | European Pat. Off. . |
| 1604599 | 5/1966 | Fed. Rep. of Germany . |
| 0047839 | 3/1982 | Fed. Rep. of Germany . |
| 3919360 | 6/1989 | Fed. Rep. of Germany . |
| 1479973 | 5/1967 | France . |
| 2148518 | 3/1973 | France . |
| 55-42802 | 3/1980 | Japan . |
| 62-19431 | 1/1987 | Japan . |
| 1157245 | 7/1969 | United Kingdom . |
| 1363721 | 8/1974 | United Kingdom . |

*Primary Examiner*—Jeffery Thurlow
*Attorney, Agent, or Firm*—Frishauf, Holtz, Goodman & Woodward

[57] ABSTRACT

In a method of and an apparatus for manufacturing a tubular thermoplastic resin film having a rough inner surface, the temperature of a mandrel located near a discharge port of a resin passage is set lower than the temperature of a die ring over a limited range in the circumferential direction of the discharge port. A cooling device is provided in the mandrel for cooling the portion of the mandrel located near the discharge port of the resin passage to a temperature lower than the temperature of the portion of the die ring located near the discharge port. The cooling device cools limited areas on the surface of the mandrel. These limited areas are spaced around the circumferential of the discharge port of the resin passage.

10 Claims, 6 Drawing Sheets

METHOD OF AND APPARATUS FOR MANUFACTURING TUBULAR THERMOPLASTIC RESIN FILM HAVING A ROUGH INNER SURFACE

This application is a continuation of application Ser. No. 07/664,032, filed Mar. 4, 1991 now abandoned.

BACKGROUND OF THE INVENTION

1. Field of the Invention

The present invention relates to a method of and an apparatus for manufacturing a tubular thermoplastic resin film having a rough inner surface.

2. Description of Related Art

Thermoplastic resins, such as flexible vinyl chloride resin, are excellent in processability, physiological stability, transparency, and cost, and are therefore extensively used as a constituent of medical goods having an annular cross-section, such as blood bags, transfusion bags, and dialysing fluid bags.

Such medical goods having an annular cross-section are conventionally formed by the tubular film process which is the extrusion process. In this tubular film process, molten thermoplastic resin is supplied into an annular resin passage formed between a mandrel and a die ring which surrounds the mandrel. The thermoplastic resin is discharged in an annular fashion from a discharge port in a state in which the temperature of the portion of the mandrel located close to the discharge port is set to a value lower than the temperature of the die ring while the air is blown into the interior of the resin to form a tubular film before the temperature of the resin does not become lower than the softening point. When the tubular film has been inflated to a desired cross-sectional dimension, the film is rapidly cooled to a temperature lower than the softening point and is thereby hardened. The hardened film is folded into two portions by pinch rolls and then wound up by a take-off roll.

The sheet formed by the blown film extrusion has specular inner and outer surfaces. Therefore, blocking phenomenon (undesired mutual adhesion of the material which occurs at a temperature lower than the melting point of that material) often occurs on the medical goods made of the thermoplastic resin film manufactured by the tubular film process. When this phenomenon happens, the medical goods cannot be opened readily. This is inconvenient for charging of medicine or blood into the medical goods.

Accordingly, the applicants of this invention have proposed in Japanese Patent Laid-Open No. Sho 62-19431 the method of preventing blocking which occurs on the inner surfaces of the thermoplastic resin film. In this conventional method, the molten thermoplastic resin is discharged in an annular fashion from the discharge port of the resin passage formed between the mandrel and the die ring in a state where the temperature of the portion of the mandrel is set to a value lower than the temperature of the die ring. According to this conventional method, the molten thermoplastic resin is not substantially cooled within the resin passage. However, only the portion of the thermoplastic resin which corresponds to the inner surface of the annular resin film is rapidly cooled immediately before discharge from the discharge port, causing rapid surface shrinkage to occur on the inner surface of the film which is discharged. This results in formation of the finely irregular inner surface of the film. Blocking does not occur on such a film when the inner surfaces thereof are brought into contact with each other.

However, in the annular thermoplastic resin film manufactured by the above-described conventional technique, the overall inner surface thereof has fine irregularities. This means that the opposing two inner surfaces of the tubular film have fine irregularities and are thus rough. This makes provision of sufficient transparency on the tubular film difficult. When such a tubular film is used for medical goods, the content of the medical goods cannot readily be recognized visually. Thus, handling of the medical goods deteriorates.

SUMMARY OF THE INVENTION

An object of the present invention is to provide a method of manufacturing a tubular thermoplastic resin film having a rough inner surface which enables blocking to be prevented from occurring on the inner surfaces of the tubular film, and which is sufficiently transparent.

In order to achieve the above object, according to one aspect of the present invention, there is provided a method of manufacturing a tubular thermoplastic resin film having a rough inner surface having fine irregularities by supplying a molten thermoplastic resin into a tubular resin passage formed between a mandrel and a die ring which surrounds the mandrel and by discharging the thermoplastic resin from a discharge port of the resin passage in an annular fashion in a state in which the temperature of a portion of the mandrel located near the discharge port is set lower than the temperature of a portion of the die ring located near the discharge port while supplying an air into the interior of the discharged thermoplastic resin. The temperature of the portion of the mandrel located near the discharge port of the resin passage is set lower than the temperature of the portion of the die ring over a limited range in the circumferential direction of the discharge port.

The outer surface of the mandrel adjacent the discharge port of the resin passage, whose temperature is set to be lower than the temperature of the die ring, has at least two surface area which will at least form a roughened surface on a portion of each inner surface of a double folded annular film while leaving at least one other portion of each inner surface of the double folded annular film unroughened.

The range of the mandrel surrounded by the discharge port of the resin passage is divided substantially equally into four or more even parts, and the temperature of only one of the ranges adjacent to each other, of the respective ranges of the mandrel, is set lower than the temperature of the die ring.

According to another aspect of the present invention, there is provided an apparatus for manufacturing a tubular thermoplastic resin film having a rough inner surface which comprises a mandrel, a die ring disposed in such a manner that it surrounds the mandrel and that a tubular resin passage is formed between the die ring and the mandrel, a cooling means provided in the mandrel for cooling a portion of the mandrel located near a discharge port of the resin passage to a temperature lower than a temperature of a portion of the die ring located near the discharge port, and an air supply means provided in the mandrel for supplying air into an interior of the tubular resin which is discharged from the discharge port. The cooling means is provided over a limited range in the circumferential direction of the discharge port of the resin passage.

The cooling means includes a cooling medium passage provided in the mandrel and a cooling medium which is circulated in the cooling medium passage.

The outer surface of the mandrel adjacent the discharge port of the resin passage, whose temperature is set to be lower than the temperature of the die ring, has at least two surface area which will at least form a roughened surface on a portion of each inner surface of a double folded annular film while leaving at least one other portion of each inner surface of the double folded annular film unroughened.

The range of said mandrel surrounded by the discharge port of the resin passage is divided substantially equally into four or more even parts, and the cooling means is provided over a portion only one of the ranges adjacent to each other, of the respective ranges of the mandrel.

The tubular film manufactured in accordance with the present invention has a rough surface only over the limited range on the circumference thereof. Therefore, one of the two opposing inner surfaces of the tubular film is rough while the other surface is not rough.

Accordingly, when the film is folded into two and is made tubular, one of the opposing two inner surfaces is rough, and occurrence of firm blocking is thereby prevented.

Also, when the film is folded into two and is made tubular, one of the opposing two inner surfaces is not rough, and a high degree of transparency is assured as compared with the case in which both of the inner surfaces are rough.

The outer surface of the mandrel adjacent the discharge port of the resin passage, whose temperature is set to be lower than the temperature of the die ring, has at least two surface area which will at least form a roughened surface on a portion of each inner surface of a double folded annular film while leaving at least one other portion of each inner surface of the double folded annular film unroughened.

This can be concretely realized, for example "by dividing substantially equally the range of the mandrel surrounded by the discharge port of the resin passage into four or more even parts, and setting the temperature of only one of the ranges adjacent to each other, of the respective ranges of the mandrel, lower than the temperature of the die ring.

By such a modification, it is possible to keep surely a highly transparent portion that is not a rough portion, on each portion of both one and the other surfaces of this double-folded annular film, when a medical equipment is formed by the film. Accordingly, the visibility of a content in the medical equipment can be improved with certainty.

DETAILED DESCRIPTION OF THE PREFERRED EMBODIMENT

Figure 1:
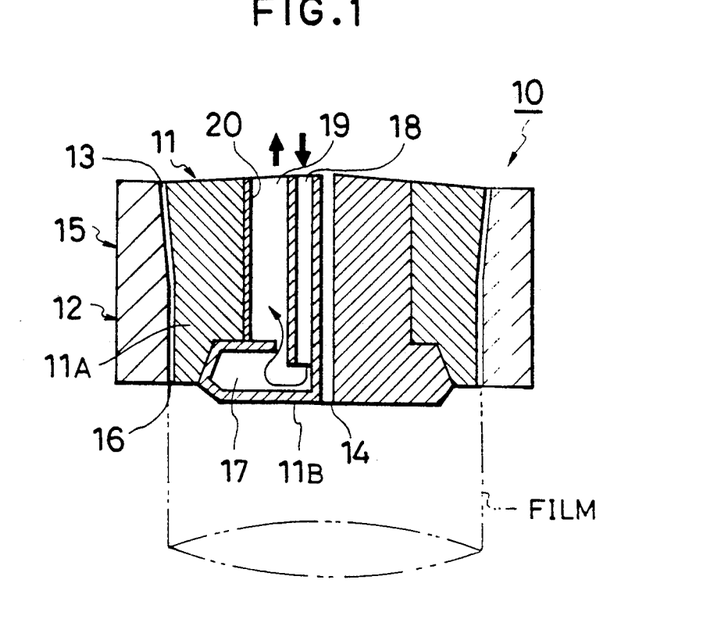
FIG. 1 is a cross-sectional view of a manufacturing apparatus according to the present invention.

A manufacturing apparatus 10 shown in FIG. 1 uses a die 15 having an annular resin passage 13 and an air discharge port 14. The die 15 is composed of a columnar mandrel 11 and an outer die ring 12 fitted on the outer periphery of the mandrel 11. The gap formed by the fitting of the outer die ring 12 on the mandrel 11 forms the annular resin passage 13. The air discharge port 14 is formed in the central portion of the mandrel 11. The die 15 also has a resin discharge port 16 which communicates with the resin passage 13. A cooling medium passage 17 is formed in the vicinity of the outer end portion of the mandrel 11 which is located on the inner side of the resin discharge port 16 along the resin discharge port 16. The cooling medium passage 17 communicates with a cooling medium introducing passage 18 and with a cooling medium discharge passage 19. The resin passage 13 has a completely circular cross-section. However, it may also have an elliptical cross-section of various flatness.

In the above-described manufacturing apparatus 10, the cooling medium passage 17 is used to pass the cooling medium therethrough which sets the temperature of the portion of the mandrel 11 which is located in the vicinity of the discharge port 16 of the resin passage 13 to a value lower than the temperature of the portion of the die ring 12 which is located in the vicinity of the discharge port 16. Also, the air discharge port 14 is used to blow air into a tubular resin which is extruded in an annular fashion from the resin discharge port 16 and thereby form a tubular resin film.

Figure 2:
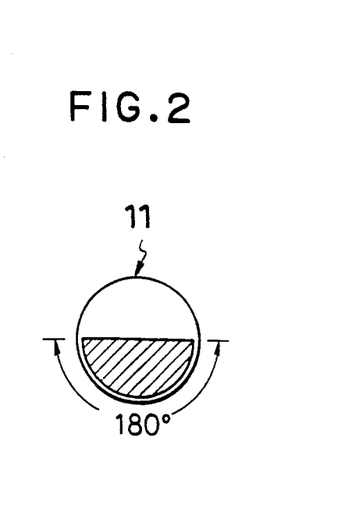
FIG. 2 schematically shows the cooled range of a mandrel.

The cooling medium passage 17 is formed over a certain range of the circumference of the discharge port 16 of the resin passage 13, which is 180 degrees on the circumference in this embodiment (see FIG. 2). Hence, the temperature of the mandrel 11 is set to a value lower than the temperature of die ring 12 over a certain range of the circumference of the discharge port 16, which is 180 degrees on the circumference of the discharge port 16 in this embodiment. The mandrel 11 is composed of a substantially cylindrical mandrel body portion 11A and a passage forming portion 11B fixedly fitted into the interior of the mandrel body portion 11A. A heat insulating member 20 is coated on the portion of the inner surface of the mandrel body portion 11A which defines the cooling medium discharge passage 19 which extends along the intermediate portion of the resin passage 13.

Thermoplastic resin film blowing which uses the manufacturing apparatus 10 is conducted in the manner described below. A molten thermoplastic resin is passed through the resin passage 13 of the die 15. The molten thermoplastic resin is discharged from the resin discharge port 16 in an annular fashion while the cooling medium is introduced from the cooling medium introducing passage 18 and circulated in the cooling medium passage 17 so as to cool the outer surface of the mandrel located on the inner side of the resin discharge port over the 180 degrees range on the circumference thereof. Before the thus discharged (tubular) thermoplastic resin is hardened, an air which is supplied from the air port 14 is retained in the interior of the tubular resin. To retain air is to supply a predetermined amount of air in the interior of the tubular resin so that the resin does not flatten and so that the inner surfaces thereof do not come into contact with each other, which would occur immediately after the resin is discharged from the discharge port. That is, according to the present invention, the molten thermoplastic resin is not substantially cooled within the resin passage but only the portion thereof which corresponds to the inner surface of the tubular resin film is rapidly cooled only over the range of 180 degrees on the circumference thereof immediately before the resin is discharged from the discharge port. Consequently, rapid surface shrinkage occurs on the inner surface of the resin film only over the range of 180 degrees when the resin film is discharged from the discharge port. As a result, the inner portion has uniform fine irregularities only over the range of 180 degrees of the film.

The preferred range of the inner surface of the resin film, whose temperature is lower than the ambient temperature by 5° to 60° C., is 30 mm or less in the axial direction above the lower end of the resin discharge port, with more preferred one being 20 mm or less and with the most preferred one being 15 mm or less. The temperature of the inner surface of the resin film is set lower than the ambient temperature, more preferably, by 10° to 50° C., most preferably, by 15° to 35° C. In the case of flexible vinyl choride resin, the temperature of the outer die ring is set between 150° and 200° C., while the temperature of the distal end portion of the mandrel is set between 120° and 160° C. so as to cause the resin to discharge with only the inner surface thereof being cooled. In this way, a tubular film, having a specular outer surface and a rough inner surface having uniform fine irregularities, can be obtained. If the difference in the temperature of the two sides of the die is less than 5° C., formation of a sufficiently rough surface is impossible. If the temperature difference exceeds 60° C., turbulent flow occurs in the entire resin due to excessively low temperature of the resin. This makes manufacture of a uniform sheet impossible.

In the above-described embodiment, the temperature of the mandrel is set to a value lower than the temperature of the die ring only over the range of 180 degrees on the circumference thereof. However, the range of the mandrel whose temperature is set to a lower temperature is not limited to the above example but it may be three alternate ranges out of six 60 degrees ranges equally formed on the circumference of the discharge port.

The above-described embodiment has the following advantages.

(1) The tubular film manufactured in accordance with the present invention has a rough surface only over the range of 180 degrees on the circumference thereof. Therefore, one of the two opposing inner surfaces of the tubular film is rough while the other surface is not rough.

(2) Accordingly, when the film is folded into two and is made tubular, one of the opposing two inner surfaces is rough, and occurrence of firm blocking is thereby prevented.

(3) Also, when the film is folded into two and is made tubular, one of the opposing two inner surfaces is not rough, and a high degree of transparency is assured as compared with the case in which both of the inner surfaces are rough.

The outer surface of the mandrel adjacent the discharge port of the resin passage, whose temperature is set to be lower than the temperature of the die ring, has at least two surface area which will at least form a roughened surface on a portion of each inner surface of a double folded annular film while leaving at least one other portion of each inner surface of the double folded annular film unroughened.

This can be concretely realized, for example "by dividing substantially equally the range of the mandrel surrounded by the discharge port of the resin passage into four or more even parts, and setting the temperature of only one of the ranges adjacent to each other, of the respective ranges of the mandrel, lower than the temperature of the die ring.

By such a modification, it is possible to keep surely a highly transparent portion that is not a rough portion, on each portion of both one and the other surfaces of this double-folded annular film, when a medical equipment is formed by the film. Accordingly, the visibility of a content in the medical equipment can be improved with certainty.

Although flexible vinyl chloride resin is optimal as the thermoplastic resin employed in the present invention, any resin can be used so long as the flow characteristics of that resin resemble those of the flexible vinyl chloride resin. Suitable examples of such a resin include an ethylene-vinyl acetate copolymer, polypropylene, an olefin type thermoplastic elastomer, and polyethylene chloride. Suitable cooling media include silicone oil, water, air and 1,1,2-trichloro-1,2,2-trifluorethane.

Examples of the present invention will be described below (see Table 1—1 and Table 1-2).

Examples a to e of the manufacturing method according to the present invention were conducted using the apparatus according to the present invention shown in FIG. 1 by supplying compressed air into the cooling medium passage respectively under pressures of 1.8 kgf/cm$^2$, 1.7 kgf/cm$^2$, 1.6 kgf/cm$^2$, 1.5 kgf/cm$^2$ and 1.4 kgf/cm$^2$. A conventional example f was conducted using the conventional apparatus in which the cooling medium passage was provided over the range of 360 degrees in the circumferential direction of the discharge port of the resin passage.

In each of examples a to f, a molten flexible vinyl chloride resin (160° C.) [which was the compound whose composition consisted of 100 parts by weight of vinyl chloride resin (having a degree of polymerization of 1300), 50 parts by weight of di-2-ethylhexyl phthalate (DOP), 3 parts by weight of epoxidized soybean oil, 0.5 parts by weight of Zn-Ca metallic soap type stabilizer, and 0.5 parts by weight of lubricant] was caused to flow through the resin passage and then discharged into air from the resin discharge port while air was being supplied into the interior of the resin from the air discharge port. The obtained tubular film had a thickness of 0.4 mm and a diameter of 180 mm. During the above process, compressed air which was the cooling medium was introduced at a high speed from the cooling medium introducing passage into the cooling medium passage so as to cool the portion of the mandrel located near the resin discharge port, the compressed air being discharged out of the system from the cooling medium discharge passage.

The films obtained in examples a to e of the present invention had a rough inner surface having fine irregularities substantially over the range of 180 degrees in the circumferential direction thereof, and the film of the conventional example f had a rough inner surface having fine irregularities substantially over the range of 360 degrees on the circumference thereof. These films were each shaped into medical bags by cutting them into a length of 300 mm and by sealing a predetermined position using high-frequency wave.

Surface roughness, transmittance and blocking resistance were measured on the medical bags obtained in examples a to e of the present invention and in the conventional example f. Table 1-1 and Table 1-2 shows the results of these measurements.

Figure 3:
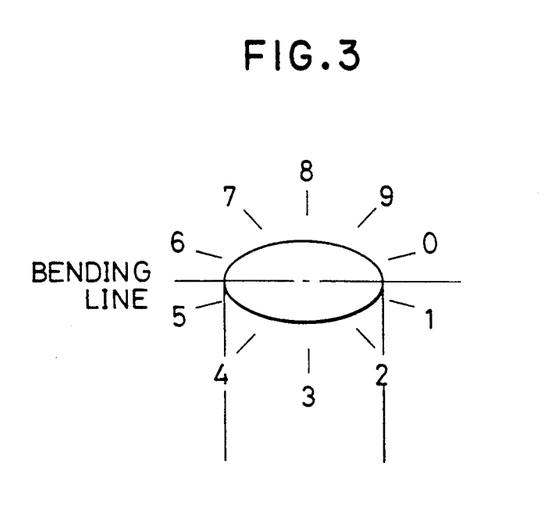
FIG. 3 schematically shows the measurement points on the circumference of a tubular film.
Figure 4:
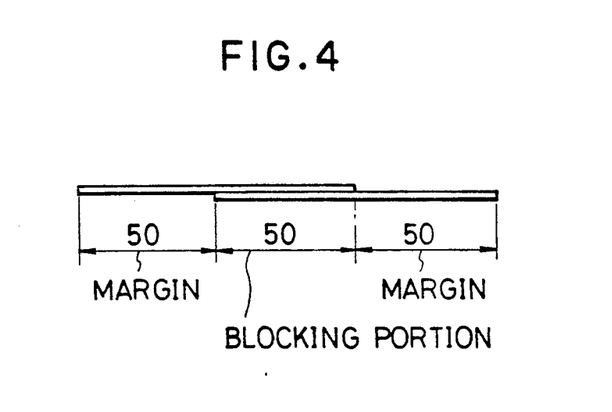
FIG. 4 schematically shows a specimen used for measurement of blocking resistance.

FIG. 3 shows the ten points, from 0 to 9, in the circumferential direction of the bag on which measurements were conducted on each of the individual medical bags. The same specimen was used for the measurements of the surface roughness and blocking resistance. The specimens used for the measurements of the blocking resistance were prepared by blanking the individual ten points on each bag and by shaping the blanked portions in the manner shown in FIG. 4.

Figure 5:
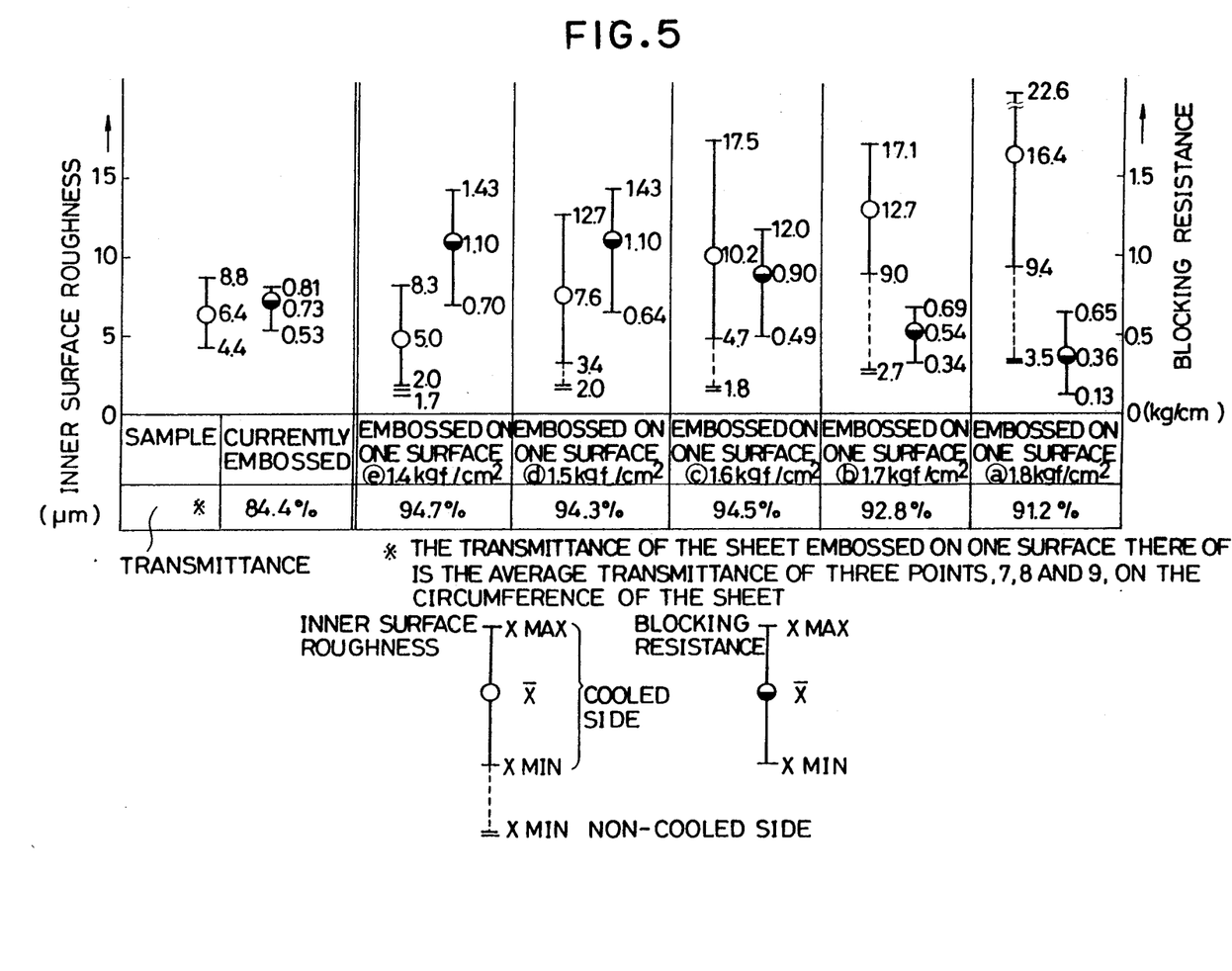
FIG. 5 is a diagram showing the results of measurements of the inner surface roughness, blocking resistance, and transmittance which are conducted on the tubular film according to the present invention and on the conventional tubular film.
Figure 6:
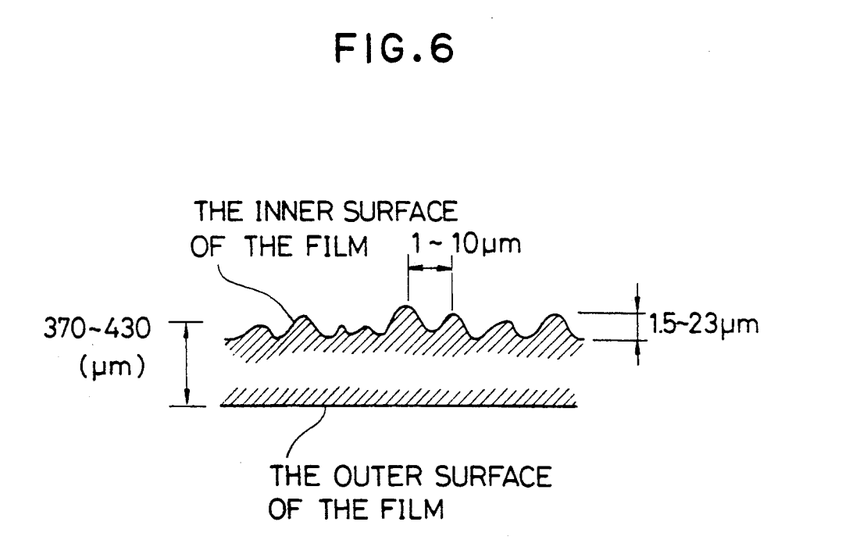
FIG. 6 schematically shows the irregularities formed on the inner surface of the tubular film according to the present invention.
Figure 7A:
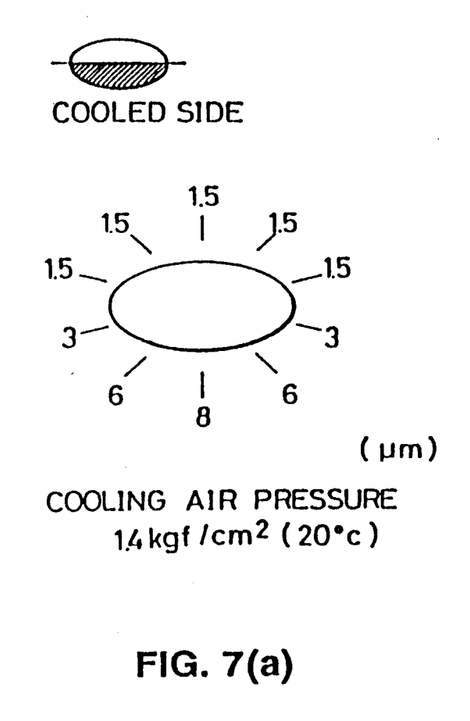
FIGS. 7(a), 7(b), 7(c) schematically shows how the irregularities on the inner surface of the tubular film according to the present invention change in the circumferential direction thereof respectively for cooled air pressures of 14, 16 and 18 Kg f/com$^2$.
Figure 7B:
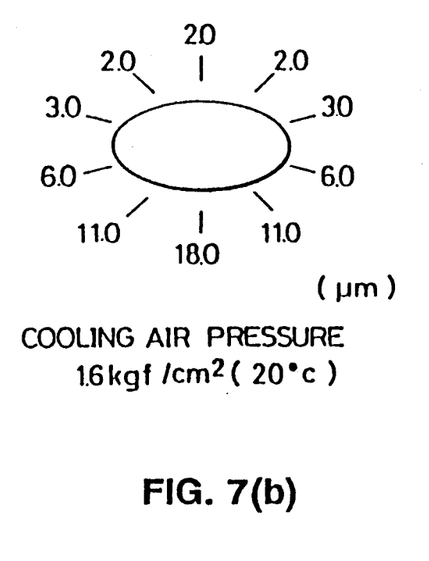
Figure 7C:
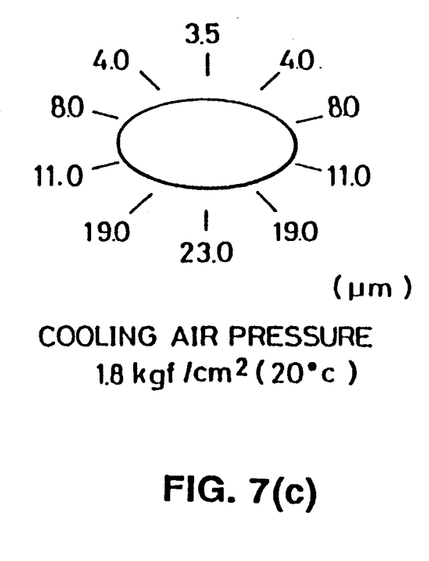
Figure 8:
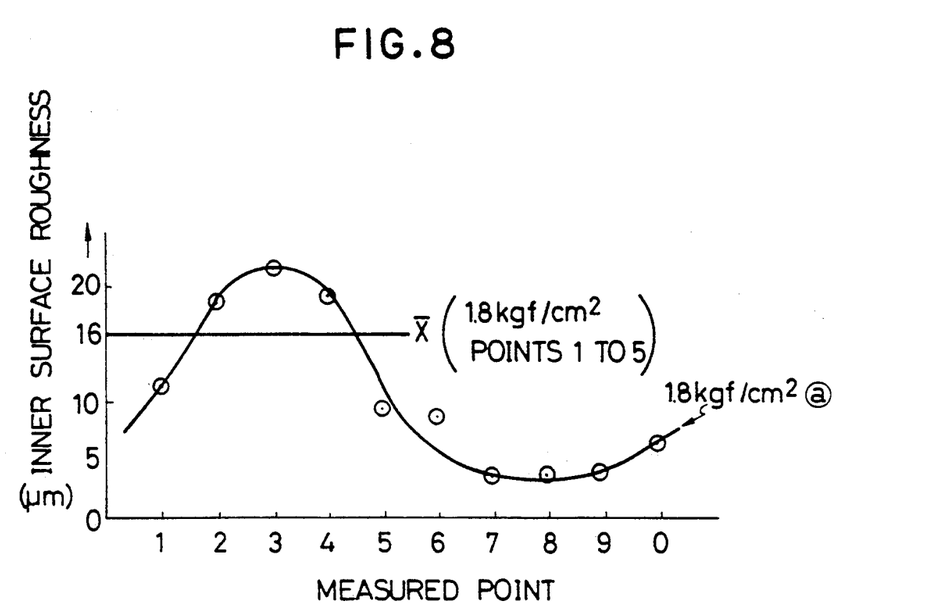
FIG. 8 is a graph showing distribution of the inner surface roughness of the tubular film according to the present invention in the circumferential direction thereof.
Figure 9:
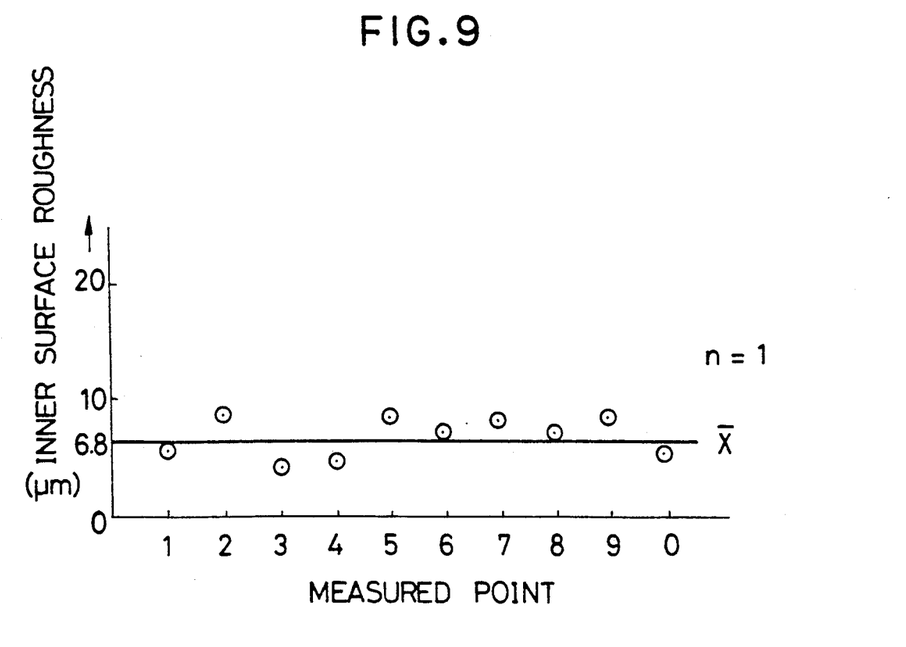
FIG. 9 is a graph showing distribution of the inner surface roughness in the circumferential direction of the conventional tubular film.

The results of the measurements of the surface roughness for examples a to f are shown in Table 1—1, Table 1-2 and FIG. 5. FIG. 6 shows the fine irregularities formed on the inner surface of each of the tubular films obtained in examples a to e of the present invention. FIGS. 7(a), 7(b) 7(c) respectively shows how the irregularities formed on the inner surface of each of the tubular films obtained in examples a, c and e of the present invention change in the circumferential direction thereof. FIGS. 8 and 9 respectively show distribution of the inner surface roughness in the circumferential direction of the tubular films obtained in example a of the present invention and in the conventional example f.

The results of the measurements of the blocking resistance for examples a to f are shown in Table 1—1, Table 1-2 and FIG. 5.

The results of the measurements of the transmittance for examples a to f are shown in Table 1—1, Table 1-2 and FIG. 5.

As is clear from the above description, the tubular films obtained in examples a to e of the present invention are not only capable of preventing occurrence of blocking, like the conventional example f, but also are transparent, unlike the conventional example f.

As will be understood from the foregoing description, it is possible according to the present invention to manufacture a tubular thermoplastic resin film which is capable of preventing occurrence of blocking on the inner surface thereof and which is sufficiently transparent.

TABLE 1-1

| | a (1.8 kgf/cm$^2$) | | | b (1.7 kgf/cm$^2$) | | | c (1.6 kgf/cm$^2$) | | |
|---|---|---|---|---|---|---|---|---|---|
| | Roughness | Transmittance | Blocking resistance | Roughness | Transmittance | Blocking resistance | Roughness | Transmittance | Blocking resistance |
| 1 | 12.0 | 76.4 | 0.51 | 9.0 | 80.0 | 0.66 | 6.4 | 86.8 | 1.17 |
| 2 | 18.9 | 66.6 | 0.25 | 14.7 | 70.0 | 0.46 | 11.7 | 74.1 | 0.73 |
| 3 | 22.6 | 70.0 | 0.13 | 17.1 | 71.9 | 0.34 | 17.5 | 74.6 | 0.99 |
| 4 | 19.2 | 70.3 | 0.24 | 15.1 | 75.9 | 0.53 | 10.9 | 80.7 | 0.89 |
| 5 | 9.4 | 80.5 | 0.65 | 7.9 | 83.6 | 0.69 | 4.7 | 90.2 | 1.20 |
| 6 | 9.0 | 82.2 | | 7.9 | 85.3 | | 3.4 | 90.6 | |
| 7 | 3.7 | 90.1 | | 2.7 | 92.0 | | 1.8 | 93.8 | |
| 8 | 3.5 | 92.1 | | 3.2 | 93.5 | | 2.7 | 94.6 | |
| 9 | 3.7 | 91.4 | | 3.1 | 92.8 | | 2.4 | 95.0 | |
| 0 | 6.3 | 85.1 | | 5.0 | 88.4 | | 3.0 | 92.3 | |

TABLE 1-2

| | d (1.5 kgf/cm$^2$) | | | e (1.4 kgf/cm$^2$) | | | f | | |
|---|---|---|---|---|---|---|---|---|---|
| | Roughness | Transmittance | Blocking resistance | Roughness | Transmittance | Blocking resistance | Roughness | Transmittance | Blocking resistance |
| 1 | 4.5 | 90.7 | 1.33 | 2.9 | 93.1 | 1.43 | 5.6 | 84.3 | 0.81 |
| 2 | 9.3 | 83.2 | 0.75 | 7.2 | 87.3 | 0.97 | 8.8 | 80.8 | 0.53 |
| 3 | 12.7 | 80.2 | 0.64 | 8.3 | 85.4 | 0.70 | 4.4 | 87.8 | 0.76 |
| 4 | 8.0 | 84.9 | 1.12 | 4.8 | 90.7 | 1.08 | 4.8 | 89.0 | 0.77 |
| 5 | 3.4 | 91.8 | 1.43 | 2.0 | 93.9 | 1.40 | 8.6 | 84.1 | 0.76 |
| 6 | 3.7 | 92.3 | | 2.5 | 94.1 | | 7.0 | 84.7 | |
| 7 | 2.2 | 93.9 | | 1.7 | 94.7 | | 8.2 | 83.3 | |
| 8 | 2.6 | 94.7 | | 2.1 | 94.6 | | 7.0 | 85.4 | |
| 9 | 2.0 | 94.2 | | 1.7 | 94.8 | | 8.4 | 72.5 | |
| 0 | 2.2 | 93.5 | | 1.7 | 94.5 | | 5.4 | 85.0 | |

What is claimed is:

1. A method of manufacturing a tubular thermoplastic resin film for use in a medical bag, said tubular thermoplastic resin film having a rough inner surface having fine irregularities therein, comprising the steps of:

supplying a molten thermoplastic resin material into a tubular passage formed between a mandrel having an outer surface and a die ring surrounding said mandrel, said mandrel and die ring defining an annular passage therebetween;

the molten thermoplastic being in contact with the outer surface of the mandrel;

discharging said thermoplastic resin as a tubular resin film from a discharge port of said tubular passage, said discharge port having a circumference formed of a plurality of circumferential portions;

controlling a temperature of at least one area on the outer surface of the mandrel near said discharge port to be lower than a temperature of at least a portion of the die ring near said discharge port;

supplying air into an interior of the discharged tubular resin film, as said tubular resin film is being discharged from the discharge port;

double folding the thus discharged tubular resin film so that a first and a second interior surface of the double folded tubular resin film face each other; and positioning said at least one area on the outer surface of the mandrel adjacent to one of said plurality of circumferential portions forming the circumference of said discharge port;

said at least one area on the outer surface of the mandrel cooling a circumferential portion of the tubular resin film in contact therewith, said circumferential portion of the tubular resin film having a roughened surface caused by the cooling of the tubular resin film by contacting said at least one lower temperature area on the outer surface of the mandrel;

the thus roughened circumferential portion of the tubular resin film being positioned so that when said tubular film is double folded to have the first and second interior surfaces thereof face each other, at least one of the first and second interior surfaces has a portion that has been roughened by cooling;

at least one uncooled portion of the tubular resin film being unroughened and transparent; and said at least one uncooled portion of the tubular resin film being provided on another one of the first and second interior surfaces of the double folded tubular resin film which face each other to provide at least one unroughened and transparent portion on said another one of the first and second interior surfaces of the double folded tubular resin film to thereby enable a viewing of the interior of the tubular resin film.

2. The method according to claim 1, further comprising:

sealing an open end portion of the double folded tubular resin film to form a medical bag.

3. The method according to claim 1, wherein:

said at least one area on the outer surface of the mandrel comprises at least two areas near said discharge port having said lower temperature then said at least a portion of said die ring;

the at least two areas on the outer surface of said mandrel are divided into at least four equal portions that are respectively positioned adjacent different ones of said plurality of circumferential portions forming the circumference of said discharge port; and the temperature of alternate ones of the at least four equal portions are cooled to a temperature that is lower than the temperature of said die ring.

4. The method according to claim 3, wherein the at least four equal portions is an even number greater than four.

5. The method according to claim 1, wherein:

said at least one area on the outer surface of the mandrel adjacent the discharge port and having the temperature thereof controlled in the controlling step, is divided into an even number of equal parts; and said even number of equal parts is equal to at least four.

6. The method according to claim 1, wherein the temperature of said at least one area on the outer surface of the mandrel is controlled to be cooler then the at least a portion of the die ring.

7. An apparatus for manufacturing a tubular thermoplastic resin film for use in a medical bag, said tubular thermoplastic film having a rough inner surface, said apparatus comprising:

a mandrel having an outer surface;

a die ring positioned to surround said mandrel;

a tubular resin passage being formed between said die ring and said mandrel for receiving a molten thermoplastic resin material to contact the outer surface of the mandrel, said tubular resin passage having a circumference defined by a plurality of circumferential portions;

cooling means provided in said mandrel for cooling at least one area on the outer surface of the mandrel, said at least one area being positioned near a discharge port of the tubular resin passage for discharging the tubular thermoplastic resin film from said tubular resin passage, said at least one area being cooled to a temperature lower than a temperature of a portion of the die ring positioned near said discharge port;

said cooling means comprising a cooling medium passage formed in said mandrel and a cooling medium circulating through said cooling medium passage;

an air supply means provided in said mandrel for supplying air into an interior portion of the tubular resin film when said tubular resin film is discharged from said discharge port;

means for double folding the tubular resin film discharged from the discharge port so that a first and a second interior surface of the double folded tubular resin film face each other;

said at least one area on the outer surface of the mandrel cooling a circumferential portion of the tubular resin film that is in contact therewith, said circumferential portion of the tubular resin film having a roughened surface caused by the cooling of the tubular resin film by the at least one area on the outer surface of the mandrel;

said roughened circumferential portion of the tubular resin film being positioned so that when the tubular resin film is double folded to have the first and second interior surfaces thereof face each other, at least one of the first and second interior surfaces has a portion that has been roughened by cooling;

at least one uncooled portion of the tubular resin film being unroughened and transparent; and said at least one uncooled portion of the tubular resin film being provided on another one of the first and second interior surfaces of the double folded tubular resin film which face each other to provide at least one unroughened and transparent portion on said another one of the first and second interior surfaces of the double folded tubular resin film to thereby enable a viewing of the interior of the tubular resin film.

8. The apparatus of claim 7, further comprising:

means for sealing at least a portion of the double folded resin film to form a medical bag.

9. An apparatus for manufacturing a tubular thermoplastic resin film for use in a medical bag, said tubular thermoplastic film having a rough inner surface, said apparatus comprising:

a mandrel having an outer surface;

a die ring positioned to surround said mandrel;

a tubular resin passage, being formed between said die ring and said mandrel for receiving a molten thermoplastic resin material to contact the outer surface of the mandrel having a circumference defined by a plurality of circumferential portions;

cooling means provided in said mandrel for cooling at least one area on the outer surface of the mandrel, said at least one area being positioned near a discharge port of the tubular resin passage for discharging the tubular thermoplastic resin film from said tubular resin passage, said at least one area being cooled to a temperature lower than a temperature of a portion of the die ring positioned near said discharge port;

said cooling means comprising a cooling medium passage formed in said mandrel and a cooling medium circulating through said cooling medium passage;

an air supply means provided in said mandrel for supplying air into an interior portion of the tubular resin film when said tubular resin film is discharged from said discharge port;

means for double folding the tubular resin film discharged from the discharge port so that a first and a second interior surface of the double folded tubular resin film face each other;

said at least one area on the outer surface of the mandrel cooling a circumferential portion of the tubular resin film in contact therewith, said circumferential portion of the tubular resin film having a roughened surface caused by the cooling of the tubular film by the at least one area on the outer surface of the mandrel;

said at least one area on the outer surface of the mandrel, positioned adjacent to the discharge port of said resin passage, further being positioned to be adjacent to another one of the plurality of circumferential portions defining the circumference of the discharge port, said at least one area on the outer surface of the mandrel, being divided into at least four equal portions so that the at least four equal portions are spaced on the outer surface of the mandrel to be adjacent to different ones of the circumferential portions of the discharge port;

alternate ones of said at least four equal portions on the outer surface of the mandrel being cooled by said cooling means so that the temperature of the cooled alternate ones of the at least four equal portions are lower than the temperature of said die ring;

the cooled alternate ones of said at least four equal portions on the outer surface of the mandrel cooling a respective portion of the thermoplastic resin material in contact therewith, said cooling thereby roughening the portion of the tubular thermoplastic resin material cooled by said cooled alternate ones of the at least four equal portions on the surface of the mandrel to thereby provide a plurality of circumferential roughened portions on the tubular thermoplastic film;

said roughened circumferential portions of the tubular film being positioned so that when the tubular resin film is double folded to have the first and second interior surfaces thereof face each other, each of said first and second interior surfaces has a portion that has been roughened by cooling;

uncooled alternate ones of said at least four equal portions on the outer surface of the mandrel not cooling a respective portion of the thermoplastic resin material in contact therewith, to prevent a roughening of said respective portions of the tubular thermoplastic resin material to thereby provide a plurality of circumferential unroughened, transparent portions on the tubular thermoplastic film;

said uncooled portions of the tubular resin film being provided on the first and second interior surfaces of the double folded tubular resin film which face each other to provide at least one unroughened and transparent portion on each of the first and second interior surfaces of said double folded tubular resin film to thereby enable a viewing of the interior of the tubular resin film through the double folded tubular resin film.

10. The apparatus of claim 9, wherein:

said at least one area on the outer surface of the mandrel is divided into an even number of equal portions; and said even number of equal portions is at least four.

* * * * *